Sept. 15, 1970     D. J. O'NEILL     3,528,223
PETROLEUM TREATER-SEPARATOR
Filed Sept. 3, 1968     2 Sheets-Sheet 1
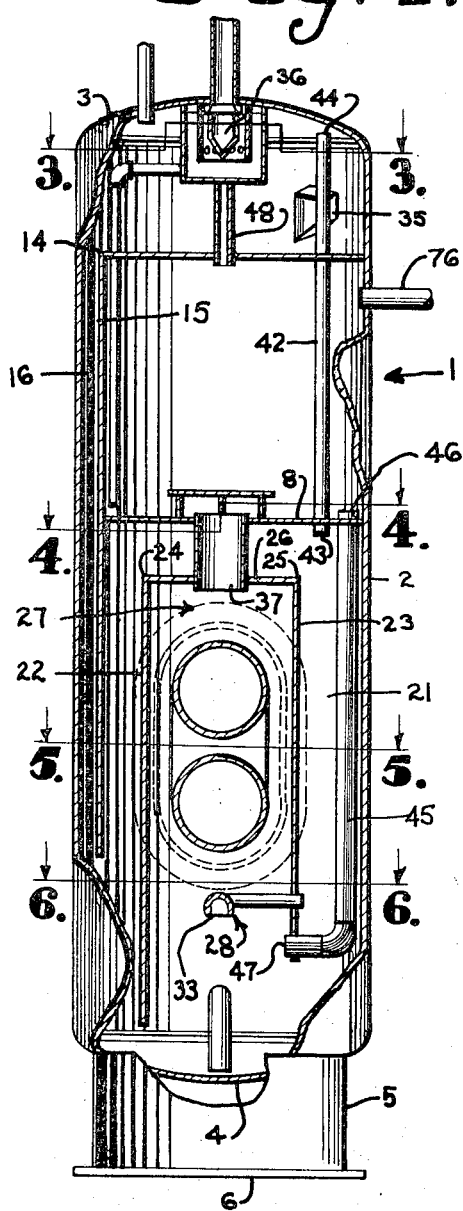
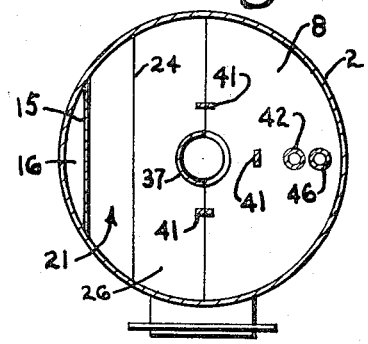
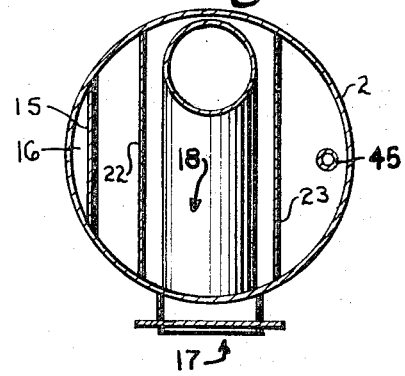
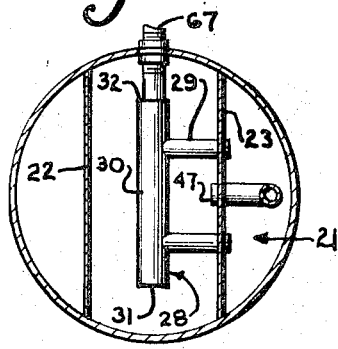
INVENTOR.
DAVID J. O'NEILL
BY
Fishburn, Gold & Litman
ATTORNEYS Sept. 15, 1970      D. J. O'NEILL      3,528,223
PETROLEUM TREATER-SEPARATOR
Filed Sept. 3, 1968      2 Sheets-Sheet 2
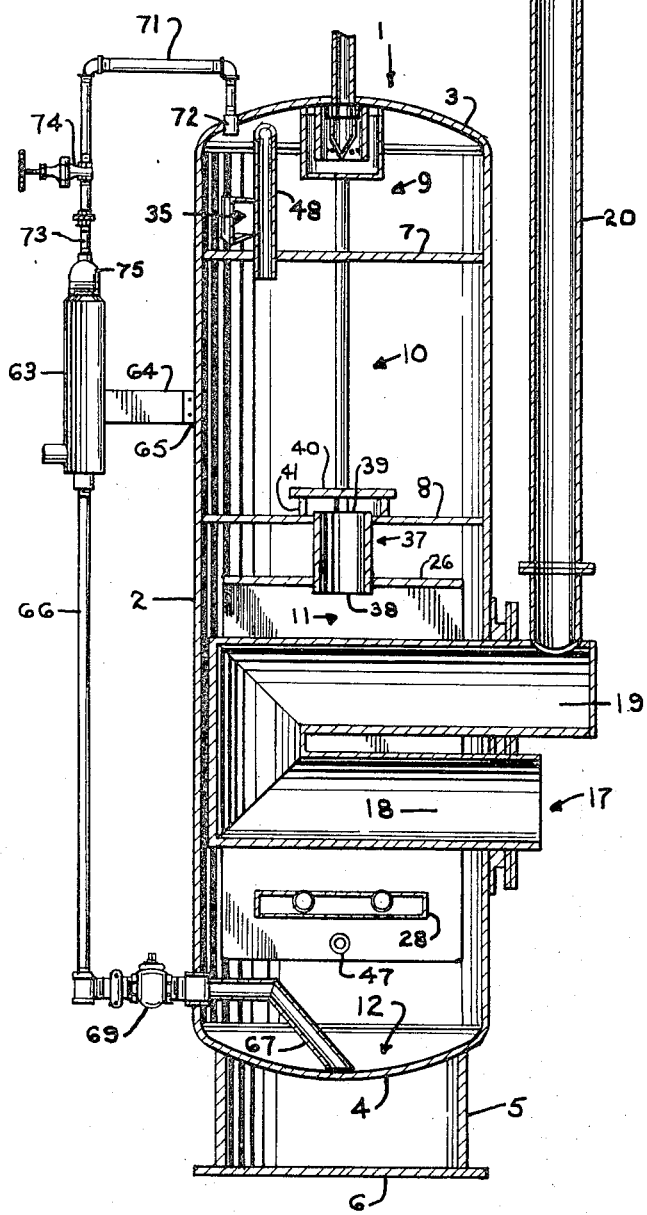
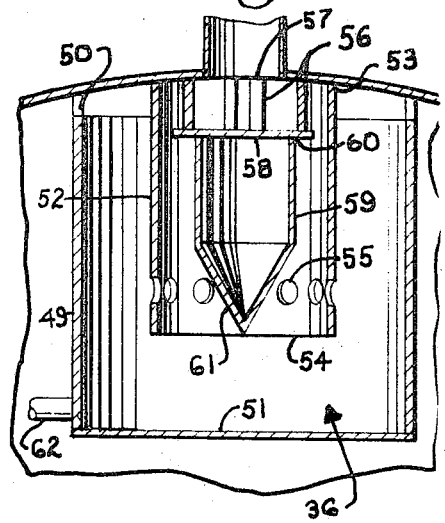
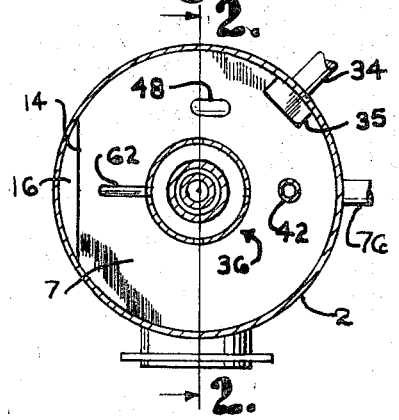
INVENTOR.
DAVID J. O'NEILL
BY
Fishburn, Gold and Litman
ATTORNEYS

3,528,223
PETROLEUM TREATER-SEPARATOR
David J. O'Neill, Great Bend, Kans., assignor to O'Neill Tank Company, Inc., Great Bend, Kans., a corporation of Kansas
Filed Sept. 3, 1968, Ser. No. 757,021
Int. Cl. B01d 19/00
U.S. Cl. 55—175     7 Claims

ABSTRACT OF THE DISCLOSURE

A petroleum well production treater-separator for separating gas, oil and water has an upright shell with two vertically spaced horizontal portions defining an upper receiving chamber, an intermediate oil collecting chamber and a lower heating chamber. The receiving chamber contains a mist eliminator and has a vertical wall depending from the upper partition and with a minor portion of the shell defining a flume to a lower portion of the shell. An inverted U-shaped partition in the treating zone is spaced from the vertical wall, the shell wall and the lower horizontal partition to define a heater containing heating zone and a U-shaped passage from the lower end of the flume up and over the heating zone. Well production flows from the receiving chamber downwardly to the treating zone through a preheat zone in the U-shaped passage and into and through the heating zone whereby the oil flows upwardly into the oil collection chamber and water flows downwardly into a lower portion of the treating chamber for discharge respectively therefrom.

---

This invention relates to treater-separator structures for oil well production and more particularly to such a structure which is vertical and has passages for flow of the production, separating gas therefrom and for preheating and then heating of oil-water emulsions and effecting separation by specific gravity of the liquids with a substantially continuous flow.

Oil wells normally produce a mixture of water, liquid hydrocarbons, and gas, and it is common for the mixture to include an emulsion. The well streams may be variously treated to effect separation of the gas and liquids and also to break the emulsions whereby the water and liquid hydrocarbon or oil may be separated. It is well established that heating emulsions aids in breaking same for gravity separation with the water settling out and the oil collecting thereabove and then the oil and water may be separately removed.

The principal objects of the present invention are: to provide a treater-separator for treating oil well production for separating gas, oil, and water components thereof; to provide such a treater separator having a substantially continuous flow of oil and water therefrom; to provide such a treater-separator wherein the water, oil, and emulsions travel through a preheat zone before entering a heating zone through spreader means; to provide such a treater-separator wherein removal of the heavier liquid such as water, from the treater-separator effects circulation therein; to provide such a treater-separator wherein a substantially uniform fluid flow is maintained through the spreader means, around the heating means in the heating zone, and from the heating zone to an oil collecting chamber; and to provide such a treater-separator which is of simple construction, efficient in operation, economical to manufacture and operate, and dependable in use.

Other objects and advantages of this invention will become apparent from the following description taken in connection with the accompanying drawings wherein are set forth by way of illustration and examples certain embodiments of this invention.

FIG. 1 is an elevational view of a vertical treater-separator embodying features of the present invention with portions broken away to better illustrate the component parts.

FIG. 2 is a vertical sectional view through the treater-separator taken on line 2—2, FIG. 3.

FIG. 3 is a horizontal sectional view through the treater-separator taken on line 3—3, FIG. 1.

FIG. 4 is a horizontal sectional view through the treater-separator taken on line 4—4, FIG. 1.

FIG. 5 is a horizontal sectional view through the treater-separator taken on line 5—5, FIG. 1.

FIG. 6 is a horizontal sectional view through a treater-separator taken on line 6—6, FIG. 1.

FIG. 7 is a transverse sectional view through a mist extractor taken on line 7—7, FIG. 3.

Referring more in detail to the drawings:

The reference numeral 1 generally designates a generally vertical treater-separator for treating oil well production and separating gas, oil, and water therefrom. The treater-separator 1 has an upright shell with a generally cylindrical side wall 2 and upper and lower ends in the form of walls or dished heads 3 and 4, respectively, suitably secured to the side wall 2, thereby defining an elongate vertical vessel which is supported on a cylindrical support member 5, suitably secured to a base 6 for resting on a foundation or platform (not shown) as in conventional practice. In the shell, there are vertically spaced upper and lower horizontal partitions 7 and 8, respectively. The upper partition 7 cooperates with the upper shell portion to define a production receiving chamber 9.

Between the upper and lower partitions 7 and 8, the shell has an intermediate oil collecting chamber 10. The shell below the lower partition 8 has a treating zone 11, with a water collecting portion 12 in the lower part thereof. The upper horizontal partition 7 has an edge 14 spaced from a minor portion of the side wall 2 and a wall 15 depending from the edge 14 to cooperate with a minor portion of the vessel side wall 2, thereby defining a flume or flow space 16 from the production receiving chamber 9 to the lower portion of the shell for flow of a liquid portion of the well production thereto. The upper horizontal partition 7 has the remaining peripheral edge suitably secured to the major portion of the vessel side wall 2. The lower horizontal partition 8 has one edge suitably secured to the vertical wall 15 and the remaining peripheral edge secured to the major portion of the vessel side wall 2, as by welding.

A heater in the form of a heater tube 17 is in the treating zone 11 and preferable has a lower tube portion 18 extending from a burner end into the shell to a reverse bend and an upper tube portion 19 outwardly to a stack 20. The vertical wall 15 is laterally spaced from and substantially parallel with one side of the heater. The free water from the lower end of the flume 16 may pass directly to the water collection portion 12 at the bottom of the shell. Oil and emulsions tend to rise. The structure provides a passage 21 up, over, and down on the other side of the heater.

This passage 21 is formed by a pair of horizontally spaced vertical baffles 22 and 23 which are mounted in the treating zone 11 and have their respective upper edges 24 and 25 below the lower horizontal partition 8 and are connected by a horizontal baffle 26. Opposite ends of the baffles 22, 23 and 26 are secured to the vessel side wall 2 so the passage 21 is outside and over said baffles, with the baffles defining a heating zone 27 inside thereof as the heater tubes are between the vertical baffles 22 and 23. The passage 21 is a preheat zone for the liquid portion of the well production.

The oil well production enters the production receiving chamber 9, where the liquid portion thereof collects on the upper horizontal partition 7 and flows through the flume 16 to the treating zone 11, where oil, emulsion and free water separate, with the oil and emulsion moving through the passage 21, up, over, and down on the other side of the heater through spreader means 28 into the zone 27, and rising around the heater and into the oil collecting chamber 10 for discharge therefrom.

In the illustrated structure, the spreader means 28 consists of a plurality of horizontally spaced conduits 29 extending through the vertical baffle 23 and each having one end supported thereon and a collection conduit 30 supported on the other ends of the conduits 29. The collection conduit 30 is substantially transverse to the spaced conduits 29 and has opposed closed ends 31 and 32. The collection conduit 30 has an elongate opening 33 extending longitudinally thereof between the closed ends 31 and 32. The opening 33 is through a lower portion of the collection conduit 30, whereby liquid flows from the preheat zone or passage 21 through the plurality of spaced conduits 29 into the collection conduit 30 and then outwardly through the elongated opening 33 into a lower portion of the heating zone 27. The collection conduit 30 is centered within the heating zone 27 and is immediately below the heater, thereby providing a substantially uniform movement of liquid around the heater to facilitate breaking the emulsion, and the settling of the water into the water collecting portion 12.

The petroleum well production is conducted to the production receiving chamber 9, through a suitable conduit 34 that is connected to a diverter or distributor 35 within the production receiving chamber 9, for providing the petroleum well production with a swirling action, thereby allowing most of the gas to break out and flow upwardly and into a mist extractor 36, as later described, mounted on the upper head 3 within the production receiving chamber 9, as later described.

The liquid portion of the petroleum well production collects on the upper horizontal partition 7 and flows downwardly through the flume 16 and into the treating zone 11. The liquid portion of the petroleum well production primarily consists of oil, free water, and emulsion. The liquid portion first engages a vertical baffle 22, which is spaced from and substantially parallel with the vertical wall 15. As additional petroleum well production is introduced into the petroleum production receiving chamber 9, with the liquid portion thereof flowing down the flume 16, the upper portion of the liquid within the treating zone 11 rises to the upper edge 24 of the vertical baffle 22 and flows across the horizontal baffle 26 into a portion of the passage 21 between the vertical baffle 23 and the vessel side wall 2.

The liquid then flows through the spreader means 28 and into the heating zone 27, where the liquid and emulsions are heated to reduce the viscosity of the liquid and especially the emulsions, whereby the breaking of the emulsions is facilitated and the emulsion component of the petroleum well production is resolved into its water and oil components, with the lighter liquid, such as the oil, moving upwardly and the water tending to settle into the water collection portion 12. This movement, together with the withdrawal of oil and water as later described, provides a substantially continuous movement or circulation of liquid and more effective heating of all the liquid in the heating zone 27. The water and oil components separate and stratifying as a result of their respective specific gravities, therefore, the oil rises into the uppermost portion of the heating zone 27 under the horizontal baffle 26.

The oil component produced by the breaking of the emulsion component of the petroleum well production flows upwardly from the heating zone 27 to the oil collecting chamber 10 through a conduit 37 having its lower end 38 extending through the horizontal baffle 26 and its upper end 39 extending through the lower horizontal partition 8.

Positioned immediately above the open upper end 39 of the conduit 37 is a deflector plate 40 for spreading the oil flow into the oil collecting chamber 10. In the illustrated structure, the deflector plate 40 is a circular member positioned in the oil collecting chamber 10 and supported by a plurality of spaced bars 41, extending between a lower surface of the deflector plate 40 and an upper surface of the lower partition 8.

Gas which breaks out of the accumulated liquid within the preheat zone or passage 21 is conveyed to an upper portion of the production receiving chamber 9 by a conductor 42 which has an open lower end 43 extending through the lower partition 8 and an open upper end 44 adjacent the upper head 3.

A conduit 45 communicates the oil collecting chamber 10 with the treating zone 11 adjacent the spreader means 28 for flow of heavier liquids from the oil collecting chamber 10 to the heating zone 27. The conduit 45 has an open upper end 46 extending through the lower horizontal partition 8 and an open lower end 47 extending through the vertical baffle 23, whereby water and emulsion received in the oil collecting chamber 10 will flow through the conduit 45 to the heating zone 27. The water will remain below an interface between water and oil in the treating zone 11 and the emulsion will rise and flow around the heater.

A vent 48 communicates the oil collecting chamber 10 with the production receiving chamber 9 for flow of gas from the oil collecting chamber 10 to the upper portion of the production receiving chamber 9, whereby the gas will flow through the mist extractor 36 and outwardly from the treater-separator 1, as later described.

In the illustrated structure, the mist extractor 36 consists of a hood 49 depending from the upper head 3 and supported by a plurality of circumferentially spaced bars 50. A lower end of the hood 49 is closed by a plate 51, thereby permitting the gas or mist breaking out from the swirling action of the petroleum well production or gas from the oil collecting chamber 10 to enter the mist extractor 36 only between the spaced bars 50. An extraction head 52 is positioned within the hood 49 and has an upper closed end 53 suitably secured to the upper head 3, as by welding, thereby closing the upper end 53. A lower end 54 of the extraction head 52 is open and has a plurality of circumferentially spaced openings 55 which are positioned adjacent the lower end 54 of the cylindrical extraction head 52, whereby gas enters the extraction head 52 through the lower open end 54, or through one of the circumferentially spaced openings 55. A plurality of bars 56 are circumferentially spaced around a gas discharge opening 57 which extends through the upper head 3, and the bars 56 each have one end suitably secured to and depending from the upper head 3 and the other end thereof supporting a plate 58 within the extraction head 52. A gas guide member 59 is positioned within the extraction head 52 and has an upper end 60 suitably secured to the plate 58, and a lower portion or end 61 which is conically shaped, whereby gas within the extraction head 52 flows upwardly around the guide member 59 and between the bars 56 and outwardly through the gas discharge opening 57.

Mist, primarily consisting of liquid petroleum and emulsions, collects on the plate 51 and flows out of the mist extractor 36 through a conduit 62, which terminates in the oil collecting chamber 10 immediately above the lower horizontal partition 8.

A suitable water receptacle, such as a weir tank 63 is mounted on the vessel side wall 2 and communicates with the water collecting portion 12 of the treating zone 11, for discharge of water from the treater-separator 1. In the illustrative structure, the weir tank 63 is supported by a bracket 64 which is suitably secured to the side wall 2, as indicated at 65. The weir tank 63 has a discharge pipe or conduit 66 connected thereto for flow of water from the treater-separator 1. A conduit 67 has a lower open end 68 positioned in the water collecting portion 12, and adjacent the lower head 4, for flow of water from the water collecting portion 12 to the weir tank 63. A suitable valve, such as a plug valve 69, is placed in the conduit 67 to control the flow of water therethrough.

A gas conduit 71 communicates an upper portion of the production receiving chamber 9 within the weir tank 63. The gas conduit 71 has an open end 72 extending through the upper head 3 and an other end 73 communicating with the weir tank 63. Suitable valve means, such as a gate valve 74, and a plug 75, are placed in the gas conduit 71 for controlling flow of gas from the upper portion of the production receiving chamber 9 to the weir tank 63, whereby the combined head of gas and water in the weir tank 63 substantially equals the head of water and oil within the treater-separator 1, for a substantially continuous flow of water from the water collection portion 12 of the treating zone 11 to effect circulation of liquids within the treater-separator 1. Oil is removed from the oil collecting chamber 10 through a conduit 76 that is at a level for cooperation with the weir tank 63 so the oil flows from the chamber 10 as the water flows from the lower portion 12 of the treater-separator 1.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A longitudinally vertical treater-separator for treating petroleum well production and separating gas, water and oil, said treater-separator comprising:
    (a) a vessel having a side wall and upper and lower end walls;
    (b) an upper horizontal partition in said vessel and cooperating with said upper end wall to define a petroleum well production receiving chamber;
    (c) a lower horizontal partition spaced below said upper partition and cooperating therewith to define an oil collecting chamber therebetween, said lower partition cooperating with said lower end wall to define a treating zone with a water collecting portion at the lower end of the vessel;
    (d) a generally inverted U-shaped baffle in the treating zone with laterally spaced upright walls and an upper connecting wall cooperating to define a heating zone between the upright walls, said U-shaped baffle cooperating with the side wall of the vessel and the lower horizontal partition to define an inverted U-shaped passage having a first upright inlet portion, a horizontal portion and a second upright portion for discharge therefrom, each of said passage portions being of substantial cross-sectional area for liquid movement therethrough, said upright walls of the baffle having lower ends spaced from the lower end wall of the vessel;
    (e) means communicating said production receiving chamber with a lower portion of said first upright inlet portion of the U-shaped passage for flow of liquid downwardly from said chamber then movement upwardly in said upright inlet portion across the horizontal portion and downwardly in the second upright portion;
    (f) heating means in said heating zone for heating liquid therein and preheating liquid moving through said inverted U-shaped passage;
    (g) spreader means communicating said second upright portion of U-shaped passage with said heating zone for flow of liquid petroleum production from the discharge of said U-shaped passage into said heating zone below the heating means;
    (h) communication means from the upper portion of said heating zone to said oil collecting chamber for flow of oil thereinto; and
    (i) means for discharging oil and water from said vessel.

2. The treater-separator as set forth in claim 1 wherein:
    (a) said means communicating the production receiving chamber with said lower portion of the inlet portion of the U-shaped passage is a flume defined by a vertical wall depending from an edge of said upper horizontal partition, said vertical wall being spaced from a minor portion of said vessel side wall and having a lower edge spaced above said vessel lower end wall;
    (b) said inverted U-shaped baffle has the upright walls horizontally spaced and substantially parallel with the connecting wall being horizontal and connecting their upper ends,
    (c) said horizontal wall being below said lower horizontal partition;
    (d) said vertical walls of the baffle are substantially parallel with said vertical wall of the flume and each of said pair of vertical walls of the baffle have lower edges below said lower edge of said flume wall; and
    (e) said pair of vertical walls and said horizontal wall of the baffle each extend across said treating zone.

3. The treater-separator as set forth in claim 1 including:
    (a) vent means communicating said oil collecting chamber with said production receiving chamber for flow of gas from said oil collecting chamber to said production receiving chamber; and
    (b) vent means communicating the upper portion of the U-shaped passage with an upper portion of said production receiving chamber for flow of gas from said passage to said production receiving chamber.

4. The treater-separator as set forth in claim 3 including:
    (a) mist and gas extraction means in an upper portion of said production receiving chamber for collecting mist and gas separated from said petroleum well production,
    (b) flow means communicating said mist and gas extraction means with said oil collecting chamber for flow of liquid therethrough; and
    (c) flow means communicating with said oil collecting chamber and extending to adjacent said vessel lower wall for flow of water from said chamber to the water collecting portion.

5. The treater-separator as set forth in claim 1 including:
    (a) a deflector in said oil collecting chamber spaced above said lower horizontal partition; and
    (b) said deflector being positioned to be impinged by flow through said communication means from said upper portion of the heating zone, whereby said flow is substantially uniformly distributed within said oil collecting chamber.

6. A longitudinally vertical treater-separator for treating petroleum well production and separating gas, water, and oil, said vertical treater-separator comprising:
    (a) a vertical cylindrical vessel having a top end wall and a bottom end wall and a side wall;
    (b) a pair of vertically spaced upper and lower horizontal partitions defining a petroleum well production receiving chamber above the upper partition and a treating zone below the lower partition and an oil collecting chamber between said upper and lower horizontal partitions;
    (c) a vertical wall depending from an edge of said upper horizontal partition, said vertical wall being spaced from a minor portion of said vessel side wall and having a lower edge above said vessel bottom end wall thereby defining a flume extending from said production receiving chamber to adjacent said vessel bottom end wall, said upper horizontal partition extending between said vertical wall and a major bottom of said vessel side wall whereby a liquid portion of said petroleum well production collects on said upper horizontal partition and flows downwardly through said flume;

(d) mist and gas extraction means adjacent said vessel top wall for collecting mist and gas from said petroleum well production receiving chamber;

(e) a first vertical baffle in said treating zone, said first vertical baffle having an upper edge below said lower horizontal partition and a lower edge above said vessel bottom end wall and below said lower edge of said vertical wall, said first vertical baffle being substantially parallel with said vertical wall and spaced therefrom;

(f) a second vertical baffle in said treating zone spaced from said first vertical baffle and substantially parallel therewith, said second vertical baffle having an upper edge aligned with said upper edge of said first vertical baffle;

(g) a horizontal baffle extending between and connected to said upper edges of said first and second vertical baffles thereby defining a heating zone below said horizontal baffle and between said vertical baffles, said baffles defining an inverted U-shaped passage between said baffles and the vertical wall said lower horizontal partition and said vessel side wall adjacent the second vertical baffle with each passage portion being of substantial cross-sectional area whereby portions of said liquid of said petroleum well production move up and over and down said inverted U-shaped passage;

(h) heating means in said heating zone for heating petroleum liquid therein and preheating the liquid moving in the inverted U-shaped passages;

(i) spreader means communicating between the portion of said inverted U-shaped passage between the second vertical wall and the vessel side wall and said heating zone for flow of petroleum to the heating zone and spreading discharge under the heating means;

(j) communication means between said oil collecting chamber and the upper end of said heating zone for movement of oil to said oil collecting chamber;

(k) water discharge means for removing water from adjacent said vessel bottom end wall; and (l) oil discharge means for removing oil from said oil collecting chamber.

7. The treater-separator as set forth in claim 6 including:

(a) vent means communicating said oil collecting chamber with said petroleum well production receiving chamber for flow of gas from said oil collecting chamber to said petroleum well production receiving chamber;

(b) vent means communicating the upper portion of said U-shaped passage with said petroleum well production receiving chamber for flow of gas from said treating zone to said petroleum well production receiving chamber;

(c) flow means communicating said mist and gas extraction means with said oil collecting chamber for flow of liquid therethrough; and (d) flow means communicating with said oil collecting chamber and extending to adjacent said vessel bottom end wall for flow of water from said oil collecting chamber to the bottom portion of the vessel.

References Cited
UNITED STATES PATENTS

| | | | |
|---|---|---|---|
| 2,319,962 | 5/1943 | Walker | 55—175 X |
| 2,420,115 | 5/1947 | Walker et al. | 55—45 |
| 2,546,269 | 3/1951 | Lovelady | 55—42 |
| 2,598,988 | 6/1952 | Glasgow | 55—42 |
| 2,614,649 | 10/1952 | Walker et al. | 55—42 |
| 2,765,917 | 10/1956 | Francis | 55—175 X |
| 2,995,202 | 8/1961 | Glasgow | 55—40 |
| 3,009,537 | 11/1961 | Glasgow et al. | 55—208 X |
| 3,401,501 | 9/1968 | Meyer | 55—176 X |

REUBEN FRIEDMAN, Primary Examiner

R. W. BURKS, Assistant Examiner